United States Patent [19]

Skotheim

[11] Patent Number: 5,462,566
[45] Date of Patent: Oct. 31, 1995

[54] HIGH CAPACITY CATHODES FOR SECONDARY CELLS

[75] Inventor: Terje A. Skotheim, Shoreham, N.Y.

[73] Assignee: Moltech Corporation, Stony Brook, N.Y.

[21] Appl. No.: 271,097

[22] Filed: Jul. 6, 1994

Related U.S. Application Data

[62] Division of Ser. No. 78,460, Jun. 16, 1993.

[51] Int. Cl.$^6$ ........................................... H01M 4/04
[52] U.S. Cl. .................. 29/623.1; 29/623.2; 29/623.5; 429/194; 429/212; 429/213
[58] Field of Search ..................... 29/623.1, 623.2, 29/623.5; 429/194, 212, 213

[56] References Cited

U.S. PATENT DOCUMENTS

| 4,143,214 | 3/1979 | Chang et al. | 429/112 |
| 4,664,991 | 5/1987 | Perichaud et al. | 429/194 |
| 4,883,048 | 5/1989 | De Jonghe . | |
| 4,917,974 | 4/1990 | De Jonghe et al. | 429/104 |
| 4,940,640 | 7/1990 | MacDiarmid | 429/213 |

FOREIGN PATENT DOCUMENTS

| 176877 | 9/1986 | European Pat. Off. . |
| 497308 | 5/1992 | European Pat. Off. . |
| 602984 | 6/1994 | European Pat. Off. . |
| 8501293 | 3/1985 | WIPO . |

*Primary Examiner*—Stephen Kalafut
*Assistant Examiner*—M. Nuzzolillo
*Attorney, Agent, or Firm*—Roland Plottel

[57] ABSTRACT

The present invention relates to an electric current producing cell which contains an anode, a polymer electrolyte which is chemically inert with respect to the anode and the cathode, and a composite cathode having an organo-sulfur compound as a cathode active material, a conjugated polymer for the transport of electrons and a polymer electrolyte for the transport of ions.

12 Claims, 5 Drawing Sheets

(1)

(2)

Leuco Emeraldine - Fully Reduced

Emeraldine Salt - Half Oxidized

Emeraldine Base - Half Oxidized

Perniganiline - Fully Oxidized

Polyacetylene

Poly(p-phenylene)

Poly(p-phenylene vinylene)

Poly(2,5-thienylene vinylene)

R = CH$_3$, C$_2$H$_5$, n-Bu, alkoxy

HIGH CAPACITY CATHODES FOR SECONDARY CELLS

This application is a division, of application Ser. No. 08/078,460, filed Jun. 16, 1993, now pending.

BACKGROUND OF THE INVENTION

This invention relates to thin film solid state electrochemical cells. More particularly, this invention relates to novel positive electrodes consisting of composites of an organosulfur compound, a p-doped conjugated polymer and a polymer electrolyte.

Considerable interest has been shown over the last few years in thin film secondary lithium batteries based on polymer electrolytes and insertion material cathodes. The intense research effort is driven by new requirements for high performance batteries in portable communication equipment, consumer electronics, portable computers and electric vehicles. Thin film solid state cells using cathodes based on organo-sulfur compounds are particularly well suited because of their high energy to weight ratio.

Two main types of cathode materials used in the manufacture of thin film lithium and sodium batteries are known in the art. The first material includes transition metal chalcogenides, such as titanium disulfide with alkali metals as the anode. For example, among the cathode active chalcogenides, U.S. Pat. No. 4,049,879 lists transition metal phosphorous chalcogenides. Other U.S. Pat. Nos. such as 4,143,214, 4,152,491 and 4,664,991 describe cells wherein the cathode is a carbon/sulfur based material, generally of the $C_xS$ formula where x is typically 10 or larger.

U.S. Pat. No. 4,142,294 to Chang, et al. describes cells having cathodes containing $C_xS$, wherein x is a numerical value from about 4 to about 50. U.S. Pat. No. 4,152,491 to Chang, et al. relates to electric current producing cells where the cathode-active materials include one or more polymer compounds having a plurality of carbon monosulfide units. The carbon monosulfide unit is generally described as $(CS)_x$ wherein x is an integer of at least 5, and may be at least 50, and is preferably at least 100. In both cells developed by Chang et al., the energy storage capacity is limited because there is a low density of sulfur-sulfur bonds.

U.S. Pat. No. 4,664,991 to Perichaud, et al. describes a substance containing a one-dimensional electric conducting polymer and at least one polysulfurated chain forming a complex with the polymer. Perichaud, et al. use a material which has two components. One is the conducting polymer, which is selected from a group consisting of polyacetylenes, polyparaphenylenes, polythiophenes, polypyrroles, polyanilines and their substituted derivatives. The other is a polysulfurated chain which is in a charge transfer relation to the conducting polymer. The polysulfurated chain is formed by high temperature heating of sulfur to produce a chain of the composition . . . S-S-S-S . . . of indeterminate length. As a result of using this material, the cell of Perichaud, et al, exhibits a fairly low voltage of only 2.0 volts against lithium.

In a related approach, U.S. Pat. No. 4,833,048 to DeJonghe, et al. describes a cathode made of organo-sulfur compounds of the formula $(R(S)_y)_n$ where y=1 to 6; n=2 to 20, and R is one or more different aliphatic or aromatic organic moieties having one to twenty carbon atoms. One or more oxygen, sulfur, nitrogen or fluorine atoms associated with the chain when R is an aliphatic chain can also be included. The aliphatic chain may be linear or branched, saturated or unsaturated. The aliphatic chain or the aromatic rings may have substituted groups. The preferred form of the cathode material is a simple dimer or $(RS)_2$. When the organic moiety R is a straight or branched aliphatic chain, such moieties as alkyl, alkenyl, alkynyl, alkoxyalkyl, alkythioalkyl, or aminoalkyl group and their fluorine derivatives may be included. When the organic moiety comprises an aromatic group, the group may comprise an aryl, aralkyl or alkylaryl, including fluorine substituted derivatives, and the ring may contain one or more nitrogen, sulfur or oxygen heteroatoms in the ring as well.

In the cell developed by DeJonghe, et al., the main cathode reaction during discharge and recharge of the cell, is the breaking and reforming of sulfur-sulfur bonds. The breaking of sulfur-sulfur bonds is associated with the formation of sulfur-metal ionic complexes. The organo-sulfur materials investigated by DeJonghe, et al. undergo polymerization and depolymerization upon the formation and breaking of the sulfur-sulfur bonds. The depolymerization which occurs during the discharging of the cell results in lower weight monomeric species which can dissolve into the electrolyte. The result is an unsatisfactory cycle life having a maximum of about 200 discharge-charge cycles.

Sotomura et al. [*Electrochimica Acta*, Vol. 37, pp. 1851–1854, (1992)], discusses the formation of composite cathode materials for lithium cells based on conducting polyaniline, a gel polymer electrolyte and a 2,5-dimercapto-1,3,4-thiadiazole compound which can undergo polymerization-depolymerization reactions as described by DeJonghe et al. The composite with polyaniline provides a higher voltage vs. lithium anodes than can be provided by the organo-sulfur compound alone. The key problem, as revealed by the compounds described by DeJonghe et al., remains, however, as the organo-sulfur compound depolymerizes upon discharge of the cell to form monomeric species which diffuses into the bulk of the electrolyte and severely limits the cycle life of the cell.

Despite the various approaches proposed for organo-sulfur cathode materials, there remains a need for an inexpensive cathode material having a high storage capacity, high discharge rate and a long cycle life at ambient temperatures.

Whereas the organo-sulfur materials described by DeJonghe et al. and by Sotomura et al. lead to the formation of monomeric species upon discharge of the cell, and consequently, a severely limited cycle life due to diffusion of the monomeric cathode materials into the bulk electrolyte, it is a primary objective of this invention to provide new composite cathode materials which avoid the limitations existing in the prior art, while offering performance characteristics much higher than those of known materials, and having an actual specific energy in excess of 1,000 Wh/kg.

It is another object of this invention to provide a new composite cathode having as the active material an organo-sulfur compound and a p-doped conjugated polymer as the electronically conducting component, wherein the organo-sulfur compound is a high molecular weight compound which does not undergo de-polymerization to form soluble molecular species upon reduction.

It is another object of this invention to provide a new composite cathode having as the active cathode material poly(carbon disulfide) having the formula $(CS_x)_n$ where x is from about 1.7 to about 2.3, and where n is greater than 2, and preferably greater than 20, and most preferably greater than 50; and p-doped polyaniline (polyaniline) as the electronically conducting component.

It is yet another object of this invention to provide a method of making a solid state rechargeable cell including the novel composite cathode of the invention.

Co-pending U.S. Pat. application Ser. No. 07/991,948, filed on Dec. 17, 1992, describes the use of poly(carbon disulfide) as cathode active material. Reference is made thereto, and is incorporated herein.

SUMMARY OF THE PRESENT INVENTION

The present invention provides a rechargeable, solid state electric current producing cell which contains:

(a) an anode which is one or more alkali or alkaline earth metals and mixtures thereof, composites of alkali metals and a conjugated polymer, or intercalated carbon;

(b) a novel composite cathode having as the cathode active material one or more carbon-sulfur compounds, one or more conjugated polymers, suitably p-doped, and a polymer electrolyte, wherein said p-doped conjugated polymer enhances the cell voltage; and (c) an electrolyte which is chemically inert with respect to the anode and the cathode and which permits the transportation of ions between the anode and the cathode.

The anode material may be an elemental metal or an alloy including the mixtures of an elemental metal and one or more alloys made form an element selected from the Periodic Table Group IA and IIA metals. Lithium and sodium are useful materials for the anode of the cell of the invention. The anode may also be intercalated carbon such as $LiC_x$ where x is equal to 6 or greater. The anode may also be a composite made from an alkali metal such as lithium or sodium and an n-doped conjugated polymer such as poly(p-phenylene), poly(p-phenylene vinylene) or polyacetylene. The anode may also consist of two or more layers with an n-doped conjugated polymer, such as poly(p-phenylene), poly(p-phenylene vinylene) or polyacetylene, interposed between the electrolyte and an alkali metal or an alkali metal composite.

The cathode employed in the cell of the invention is a composite material consisting of an organo-sulfur compound, such as poly(carbon disulfide), as the cathode active material, a polymer electrolyte for the transport of ions, and a p-doped conjugated polymer, such as polyaniline, poly(p-phenylene) or poly(p-phenylene vinylene), for the transport of electrons. The conjugated polymer is chosen to have a higher voltage versus the anode than the organo-sulfur compound, thereby increasing the voltage of the cell. Composite cathodes made from poly(carbon disulfide) and polyaniline have been used directly as the cathode material for the cell of the invention.

Two polymer electrolytes have been successfully used in the fabrication of the cell of the invention. One system is based on a branched polysiloxane with ethylene oxide side chains and methacrylate moieties for crosslinking with ultraviolet radiation in the presence of a dissolved lithium salt, such as $LiSO_2CF_3$. The other system is a polyether chemically modified to maintain an amorphous state at ambient temperatures.

A method of making the solid state cell of the invention as a multilayer thin film laminate is also provided. The method of making the cells of the present invention is particularly preferred for use in applications requiring long term energy storage and as backup power sources.

As a result of the present invention, solid state rechargeable battery cells are provided having a higher voltage and higher energy density than has previously been achieved with organo-sulfur cathode materials. In addition, these cells also have long shelf life, a low rate of self discharge and a long cycle life.

For a better understanding of the present invention, reference is made to the following description and the accompanying drawings. The scope of this invention will be pointed out in the appended claims.

DETAILED DESCRIPTION OF THE INVENTION

Figure 1:
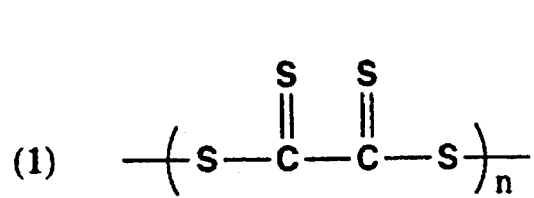
FIG. 1 shows schematically possible structures of poly(carbon disulfide).
Figure 1:
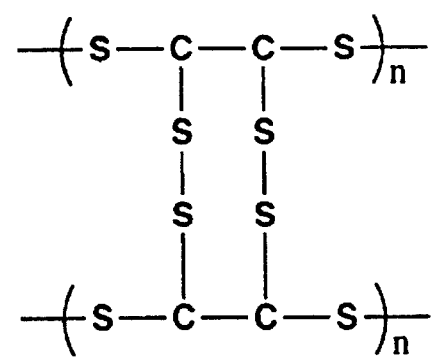
Figure 1:
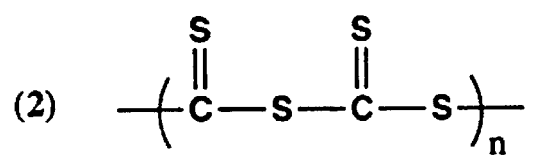
Figure 1:
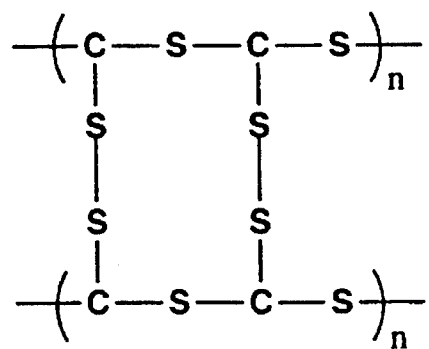

The novel cell of the invention contains a specific anode, an electrolyte, and a cathode which is a composite of a polymer electrolyte, an organo-sulfur compound, a conjugated polymer or an inorganic oxide, and an effective amount of conducting carbon. The anode employed in the cell of the invention includes one or more metals selected from the group consisting of the Periodic Table Group IA and Group IIA metals. The anode may comprise any metal capable of functioning as a negative electrode in combination with the novel composite cathode material of the invention. Preferably, however, the anode includes one or more alkali metals, one or more alkaline earth metals, or composites of alkali metals with conjugated polymers or graphitic carbon. Most preferably, the anode comprises a thin lithium film or foil, or a thin film composite of lithium and poly(p-phenylene), of a thickness from about 10 μm to about 200 μm.

The conjugated polymer-lithium composite anode may be in the form of a porous film of the conjugated polymer containing the appropriate alkali metal dispersed within the porous polymer. The conjugated polymer film may be formed from compressed powders of the polymer which has been filled with alkali metal by electrodeposition in a suitable organic solvent, as described in U.S. Pat. No. 4,695,521.

The conjugated polymer film may also be formed by thermal evaporation of the polymer, or oligomers of the polymers, such as sexiphenyl in the case of poly(p-phenylene), under vacuum. The composite of the conjugated polymer and the alkali metal may thus be formed by co-evaporation.

The electrolyte may be a thin film of a solid polymer electrolyte, such as an amorphous polyether, a branched polysiloxane with ethylene oxide side chains or a branched polyphosphazene with ethylene oxide side chains. The conductivity of the polymer electrolyte may be enhanced by the addition of plasticizer compounds of low molecular weight such as propylene carbonate, ethylene carbonate, N-methyl acetamide, sulfonate, sulfolane, 1,2-dimethoxyethane, poly(ethylene glycol), 1,3-dioxolane and glymes. Plasticized polymer electrolytes are also known as gel polymer electrolytes. The polymer electrolyte may be an exclusive cation conducting polymer electrolyte, a so-called single ion conductor, wherein the anionic charges are covalently attached to the polymer backbone. The conductivity of the single-ion conducting polymer electrolytes may be enhanced by the addition of plasticizing compounds. The preferred thickness of the polymer electrolyte is in the range of 10 μm to 100 μm.

The cathode employed in the cell of the present invention contains as its cathode active material an organo-sulfur compound, a polymer electrolyte for the transport of ions, and a p-doped conjugated polymer. In addition to providing electronic conductivity, the p-doped conjugated polymer is chosen to have a higher voltage versus the anode than the organo-sulfur compound, thereby providing a higher voltage to the cell. Most preferably, the cathode comprises poly(carbon disulfide) as the cathode active material and p-doped polyaniline as the electronically conducting conjugated polymer. Poly(carbon disulfide) may be prepared by reacting carbon disulfide with sodium metal in an appropriate solvent such as dimethylsulfoxide. The cathode has a preferred thickness from about 25 μm to about 200 μm. The poly(carbon disulfide) has a formula $(CS_x)_n$, where x is from about 1.7 to about 2.3, and n is greater than 2, preferably greater than 20, and most preferably greater than 50. The higher molecular weight prevents dissolution of the cathode active material into the electrolyte in the oxidized, or charged, state.

In either a lithium or a sodium cell, the main design concerns are the kinetics of the sulfur-sulfur bond formation and scission, the density of available sulfur atoms, the voltage versus the anode and the miscibility of the organo-sulfur compound with the polymer electrolyte.

The main advantage of using poly(carbon disulfide) as the cathode active material in solid state cells is the high density of sulfur-sulfur bonds available for oxidation-reduction. In all poly(carbon disulfide) compounds used for the cathode of the invention, the sulfur concentration is always greater than the carbon concentration. Poly(carbon disulfide) provides a cathode active material with a capacity for lithium ion storage of at least 680 mAh/gram, or about twice that of inorganic insertion compounds such as $MnO_2$, $Mn_2O_4$, $NiO_2$, $CoO_2$ or $TiS_2$.

Other advantages of using poly(carbon disulfide) as the cathode active material in solid state cells includes the virtual absence of low molecular weight moieties produced during oxidation and reduction which may diffuse into the polymer electrolyte phase, particularly with gel polymer electrolytes, and the rapid kinetics of the sulfur-sulfur bond formation and scission at ambient temperatures. Possible structures of poly(carbon disulfide) are shown in FIG. 1. The actual structure of poly(carbon disulfide) as synthesized appears to be a co-polymer of at least the two forms shown in FIG. 1, but has not yet been completely determined. The lack of solubility of poly(carbon disulfide) in common solvents is an indication of high molecular weight and is a key advantage of poly(carbon disulfide) over the organo-sulfur materials described by DeJonghe et al. The result is very long shelf life of the battery cell and greatly enhanced cycle life. Whereas the organo-sulfur materials described by DeJonghe et al. cannot sustain more than about 200 cycles in a battery cell with a lithium anode, poly(carbon disulfide) based cathodes have undergone more than 4,000 cycles.

A second significant advantage of the high molecular weight poly(carbon disulfide) is the rapid kinetics of sulfur-sulfur bond formation and scission at ambient temperatures and below, allowing the operation of a battery cell at room temperature with high cathode utilization. In contrast, the organo-sulfur materials described by DeJonghe et al, undergo efficient sulfur-sulfur bond formation and scission only at elevated temperatures of 80° C. or higher. The unusually rapid kinetics of sulfur-sulfur bond formation and scission of poly(carbon disulfide) at ambient temperatures is not fully understood but is believed to be a result of the high molecular weight of this polymer and its delocalized electronic structure, a form of conjugation. The highly reversible kinetics is an indication that poly(carbon disulfide) does not depolymerize upon reduction but maintains a high molecular weight, and, therefore, a highly delocalized electronic structure.

The main advantage of using a p-doped conjugated polymer as the electronically conducting component in the composite cathode is to provide a higher cell voltage versus the alkali metal anode than can be provided by using conducting carbon. Whereas a Li/polymer electrolyte/poly-(carbon disulfide)-carbon cell has an open circuit voltage of 2.85 volts, a Li/polymer electrolyte/poly(carbon disulfide)-polyaniline cell has an open circuit voltage of 3.23 volts. Processable forms of conjugated polymers are particularly preferred, such as the Versicon™ polyaniline product manufactured by Allied-Signal, Inc.

Figure 2:
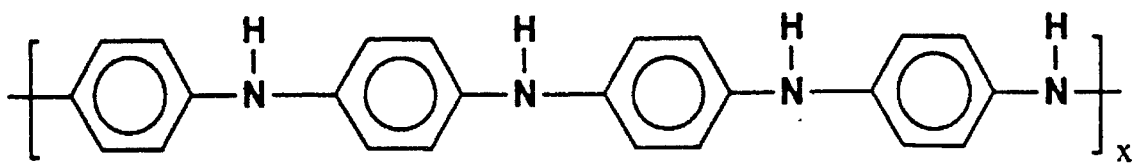
FIG. 2 shows schematically the structure of the common forms of polyaniline.
Figure 2:
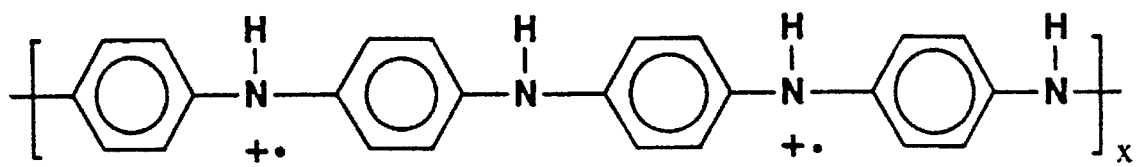
Figure 2:
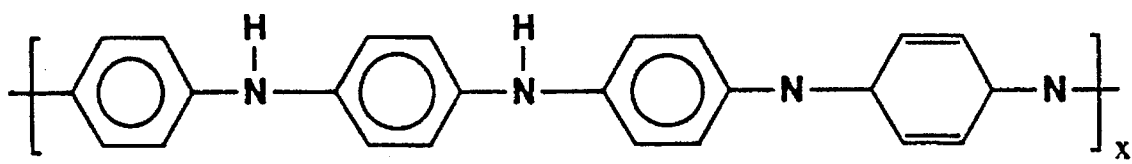
Figure 2:
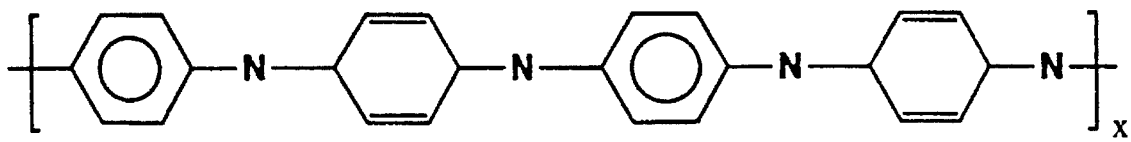
Figure 3:
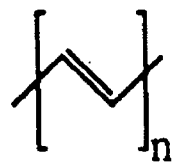
FIG. 3 shows schematically the structure of the conjugated polymers polyacetylene, poly(p-phenylene), poly(p-phenylene vinylene) and poly(2,5-thienylene vinylene).
Figure 3:
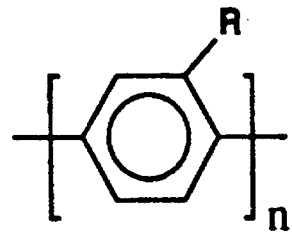
Figure 3:
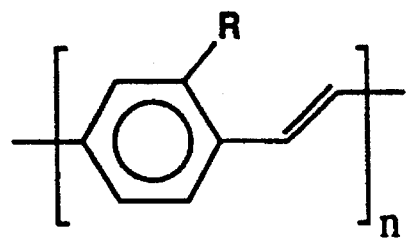
Figure 3:
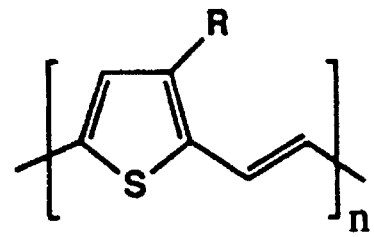
Figure 4:
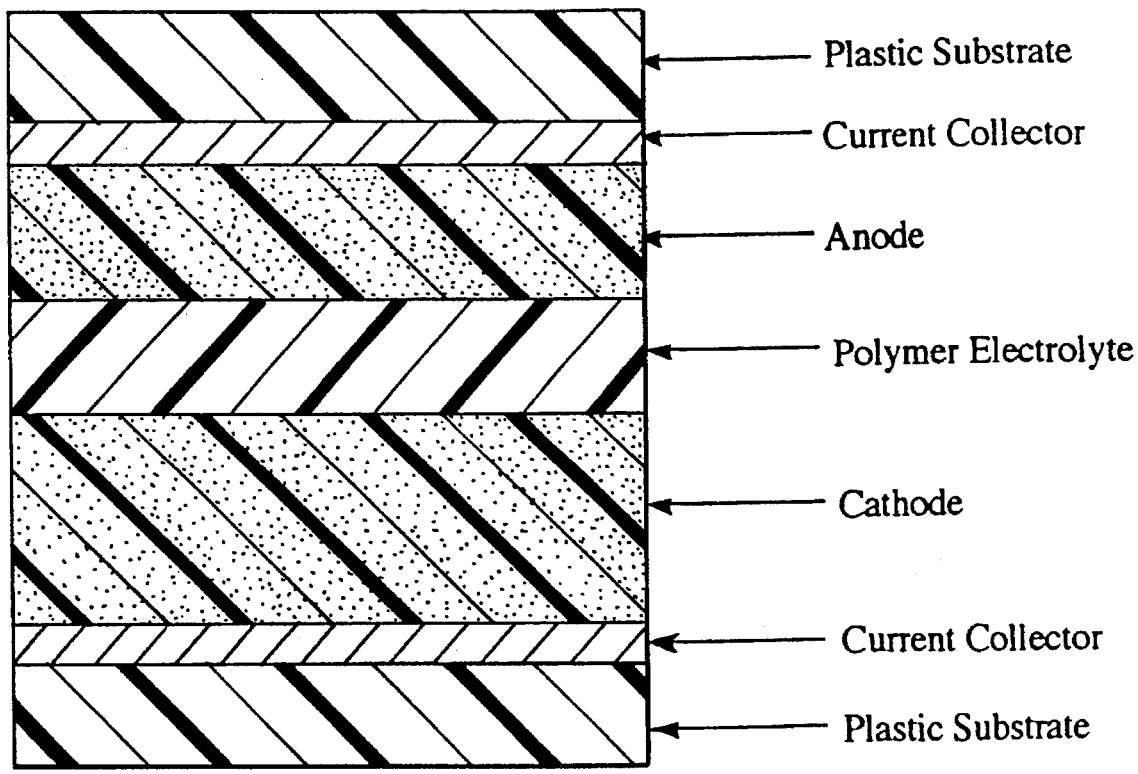
FIG. 4 shows schematically the thin film laminate structure of a cell with a single layer as anode.
Figure 5:
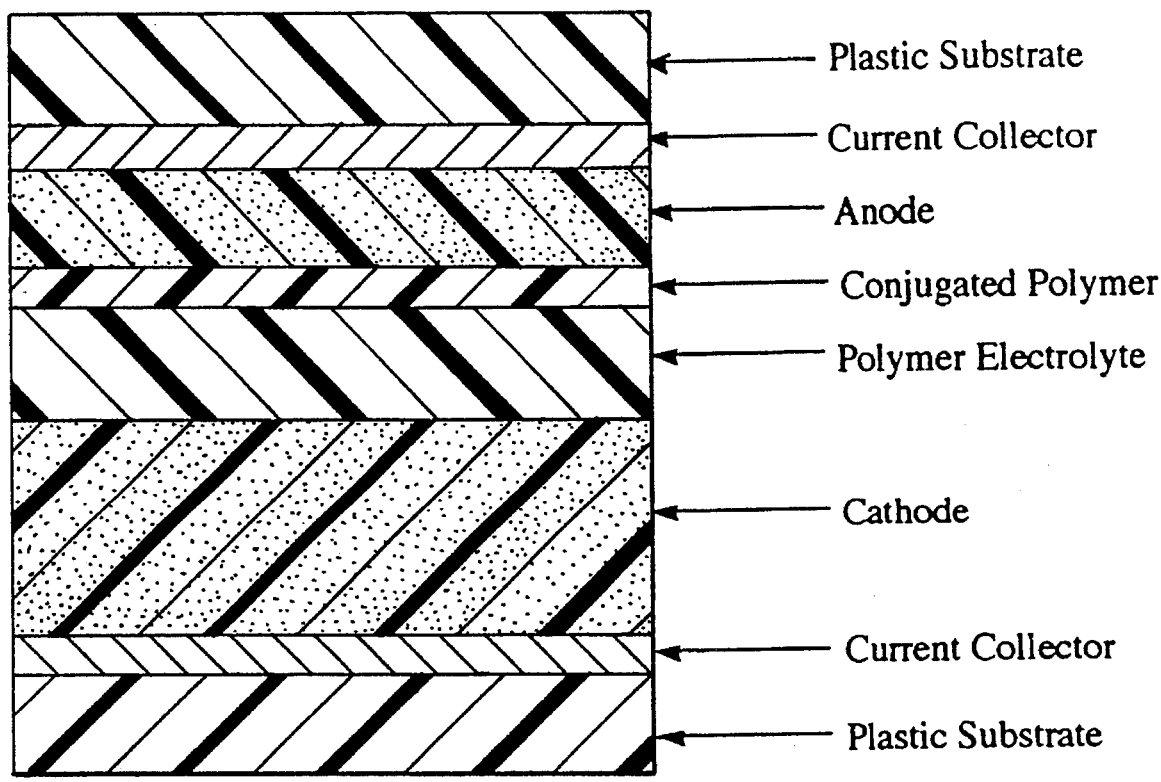
FIG. 5 shows schematically the thin film laminate structure of a cell with a thin film of a conjugated polymer interposed between the electrolyte and an alkali metal anode.

A second advantage of using a conjugated polymer as the electronically conducting component in the composite cathode is better miscibility with the polymer electrolyte and the poly(carbon disulfide) cathode active material, resulting in high electronic conductivity, and, consequently, low resistance losses in the cell. Whereas a composite cathode comprising poly(carbon disulfide), polymer electrolyte and 10% conducting carbon has a conductivity of about $10^{-4}$ S/cm, a composite cathode comprising poly(carbon disulfide), polymer electrolyte and 10% polyaniline has a conductivity of at least $10^{-3}$ S/cm, or ten times higher. FIG. 2 shows schematically the common forms of polyaniline. The preferred form of polyaniline in composite cathodes is the emeraldine salt form.

Details of preferred embodiments of the invention have been set forth herein in the form of examples which are described below.

EXAMPLES

Example 1. Preparation of Poly(carbon disulfide)-Polyaniline Composite Cathodes A composite cathode was prepared from a physical mixture of 48% wt. poly(carbon disulfide) powder, 12% wt. polyaniline powder in the form of Versicon, manufactured by Allied-Signal, Inc., 20% wt. acetylene black and 20% wt. polymer electrolyte. The polymer electrolyte used to form the composite cathode consisted of a mixture of poly(ethylene oxide) and a branched polysiloxane with ethylene oxide side chains (polysiloxane-g-(ethylene oxide)$_7$) and $LiClO_4$ in the ratio of 24 ethylene oxide units per lithium. The polymer electrolytes were dissolved in acetonitrile and added to the mixture of poly(carbon disulfide), polyaniline and acetylene black to form a viscous slurry. Composite cathodes of a thickness approximately 100 μm were cast onto Ni foil substrates and the solvent evaporated. Cells were assembled containing composite cathode, branched polysiloxane electrolyte and lithium foil anode. The open circuit potential of the cells were 3.23 volts. The corresponding open circuit voltage of cells without polyaniline in the composite cathode was 2.85 volts.

What is claimed is:

1. A method of forming a composite cathode which comprises:

coating an electrically conducting cathode substrate with a mixture comprising an amount of poly(carbon disulfide) effective to provide cathode activity, an amount of a p-doped conjugated polymer effective to transport electrons and enhance voltage against an anode, and an amount of an electrolyte effective to transport ions.

2. A method of forming a solid state rechargeable battery which comprises:

(a) providing a solid anode formed from material selected from the group consisting of one or more alkali metals, a mixture of alkali metals, one or more alkaline earth metals, alkali metal intercalated carbon, composites of an n-doped conjugated polymer and an alkali metal, composites of an n-doped conjugated polymer and an alkali metal alloy, and an alkali metal with a film of n-doped conjugated polymer interposed between said alkali metal and an electrolyte;

(b) providing a composite cathode formed by coating a current collecting cathode substrate with a mixture comprising an amount of poly(carbon disulfide) effective to provide cathode activity, an amount of a p-doped conjugated polymer effective to transport electrons and enhance voltage against an anode, and an amount of a polymer electrolyte effective to transport ions;

(c) enclosing between said anode and said cathode a further electrolyte selected from the group consisting of solid polymer electrolytes, single-ion conducting polymer electrolytes and gel polymer electrolytes.

3. A method of forming an electric current producing cell which comprises:

(a) providing an anode;

(b) providing a composite cathode containing poly(carbon disulfide) as cathode active material; a p-doped conjugated polymer which enhances the cell voltage against the anode and provides transport of electrons; and an electrolyte for the transport of ions; and (c) providing a further electrolyte which is chemically inert with respect to said anode and said cathode and which permits the transportation of ions between said anode and said cathode.

4. The method of claims 1, 2 or 3, wherein said conjugated polymer is selected from the group consisting of polyaniline, polyacetylene, polypyrrole, polythiophene, poly(p-phenylene), poly(p-phenylene vinylene), and poly(2,5-thienylene vinylene).

5. The method of claim 1, wherein said conjugated polymer is selected from the group consisting of poly(p-phenylene), poly(p-phenylene vinylene), and polyacetylene.

6. The method of claims 1, 2 or 3, wherein said cathode active material is poly(carbon disulfide) having the formula $(CS_x)_n$, wherein x is from about 1.7 to about 2.3 and n is an integer greater than 2.

7. The method of claims 1, 2 or 3, wherein said cathode active material is poly(carbon disulfide) having the formula $(CS_x)_n$, wherein x is from about 1.7 to about 2.3 and n is an integer greater than 20.

8. The method of claims 1, 2 or 3, wherein said cathode active material is poly(carbon disulfide) having the formula $(CS_x)_n$, wherein x is from about 1.7 to about 2.3 and n is an integer greater than 50.

9. The method of claim 2, wherein said single-ion conducting polymer electrolytes have an anionic moiety covalently attached to the polymer backbone.

10. The method of claim 2, wherein said single-ion conducting polymer electrolyte is a single lithium or sodium ion conducting polymer having a polysiloxane backbone.

11. The method of claim 2, wherein the gel polymer electrolyte is a single-ion conducting polymer electrolyte plasticized with low molecular weight compounds selected from the group consisting of propylene carbonate, ethylene carbonate, N-methyl acetamide, sulfonate, sulfolane, poly(ethylene glycol), 1,2-dimethoxy-ethane, glymes and 1,3-dioxolane.

12. The method of claims 1, 2 or 3, wherein said conjugated polymer is polyaniline.

* * * * *